(12) United States Patent
Fang et al.

(10) Patent No.: US 11,349,704 B2
(45) Date of Patent: May 31, 2022

(54) PHYSICAL LAYER INTERFACE WITH REDUNDANT DATA PATHS

(71) Applicant: Credo Technology Group Limited, Grand Cayman (KY)

(72) Inventors: Calvin Xiong Fang, Palo Alto, CA (US); Haoli Qian, Fremont, CA (US); Ashwin Upadhya, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/904,074

(22) Filed: Jun. 17, 2020

(65) Prior Publication Data

US 2021/0399941 A1 Dec. 23, 2021

(51) Int. Cl.
*H04L 41/0654* (2022.01)
*H04L 43/0823* (2022.01)
*H04L 45/24* (2022.01)

(52) U.S. Cl.
CPC ...... *H04L 41/0654* (2013.01); *H04L 43/0823* (2013.01); *H04L 45/24* (2013.01)

(58) Field of Classification Search
CPC .. H04L 41/0654; H04L 45/24; H04L 43/0823
See application file for complete search history.

(56) References Cited

U.S. PATENT DOCUMENTS

| | | | |
|---|---|---|---|
| 6,259,699 B1 | 7/2001 | Opalka et al. | |
| 6,396,303 B1 | 5/2002 | Young | |
| 7,079,525 B1 | 7/2006 | Goldstein et al. | |
| 8,004,961 B1* | 8/2011 | Buchanan | H04L 49/357 370/216 |
| 9,106,570 B2 | 8/2015 | Masood | |
| 9,385,859 B2 | 7/2016 | Kuan | |
| 9,606,573 B1 | 3/2017 | Ebeling | |
| 10,212,260 B2 | 2/2019 | Sun | |
| 10,855,278 B1 | 12/2020 | Sheredy | |
| 2003/0002116 A1* | 1/2003 | Hayashi | H04B 10/69 398/141 |
| 2003/0131301 A1* | 7/2003 | Shimono | H04L 7/04 714/752 |
| 2009/0245258 A1* | 10/2009 | Tanaka | H04L 49/351 370/392 |

(Continued)

OTHER PUBLICATIONS

"Physical Medium Dependent (PMD) sublayer and baseband medium, type 50GBASE-CR, 100GBASE-CR2, and 200GBASE-CR4," Draft Amendment to IEEE Std 802.3-2015, Feb. 3, 2017, pp. 184-215, 32 pgs.

(Continued)

*Primary Examiner* — Jeffrey M Rutkowski
*Assistant Examiner* — Chae S Lee
(74) *Attorney, Agent, or Firm* — Ramey LLP; Daniel J. Krueger

(57) ABSTRACT

An illustrative embodiment of a disclosed physical layer interface device includes: a first transmitter and a first receiver for a primary data path; a second transmitter and a second receiver for a secondary data path; a third transmitter and a third receiver for a non-redundant data path; and a multiplexer. The third receiver is coupled to provide a data stream received from the non-redundant data path concurrently to the first and second transmitters, and the multiplexer provides the third transmitter with a selected one of the data stream received via the primary data path and the data stream received via the secondary data path. Disclosed network switch embodiments employ the illustrative physical layer interface to provide internal or external data path redundancy for traffic handled by the network switch.

17 Claims, 4 Drawing Sheets

(56) References Cited

U.S. PATENT DOCUMENTS

| | | | |
|---|---|---|---|
| 2010/0329325 | A1 | 12/2010 | Mobin et al. |
| 2013/0073749 | A1 | 3/2013 | Tremblay |
| 2013/0343400 | A1 | 12/2013 | Lusted |
| 2014/0086264 | A1 | 3/2014 | Lusted |
| 2014/0146833 | A1 | 5/2014 | Lusted |
| 2015/0003505 | A1 | 1/2015 | Lusted |
| 2016/0037486 | A1 | 2/2016 | Wentzloff |
| 2016/0134394 | A1 | 5/2016 | Tiruvur |
| 2016/0323164 | A1 | 11/2016 | Cao |
| 2016/0337114 | A1 | 11/2016 | Baden |
| 2016/0337183 | A1 | 11/2016 | Cornett |
| 2017/0324657 | A1 | 11/2017 | Zhong |
| 2018/0041332 | A1 | 2/2018 | Yang |

OTHER PUBLICATIONS

Addressing the Power-Performance IC Design Conundrum: A Novel Clock Design Technique to Reduce Power and Increase Performance. Cyclos Semiconductor, Inc., (Jun. 1, 2012). Retrieved from http://www.cyclos-semi.com/pdfs/time_to_change_the_clocks.pdf.

Jayakumar, Nikhil, et al. "Design and Tuning of a Tree-Mesh Clock Distribution." Juniper Networks presentation International Symposium on Physical Design, Jul. 2013; www.ispd.cc/slides/2013/7_Jayakumar.pdf.

Physical Coding Sublayer (PCS) for 64B/66B, type 50GBASE-R, Draft Amendment to IEEE Std 802.3-2015, Feb. 3, 2017, pp. 132-141,10 pgs.

Semiconductor Intellectual Property Core Wikipedia. Mar. 9, 2019 https://en.wikipedia.org/w/index.php?title=Semiconductor_intellectual_property_core&oldid=886997081.

Information Technology—Open Systems Interconnection—Basic Reference Model: The Basic Model, 1994.

"Physical Medium Attachment (PMA) sublayer, Physical Medium Dependent (PMD) sublayer, and baseband medium, type 1 00GBASE-KP4," IEEE Standard for Ethernet, Section Six, pp. 481-519, 39 pgs.

Reed-Solomon Forward Error Correction (RS-FEC) sublayer for 50GBASE-R PHYs, Draft Amendment to IEEE Std 802.3-2015, Feb. 3, 2017, pp. 142-159, 18 pgs.

* cited by examiner

PHYSICAL LAYER INTERFACE WITH REDUNDANT DATA PATHS

BACKGROUND

Data centers for cloud computing must run customer applications without interruption. However, both hardware and software components inevitably fail, at a rate characterized by their mean time to failure. As the data center infrastructure gets more complex the aggregated failure rate rises quickly, and for hyperscale data centers the number of failures becomes difficult to handle.

One approach to this issue is to provide some form of redundancy that enables operations to continue even as failures are identified and repaired. When expressed in terms of hardware, the redundancy may take the form of an active component and an inactive, backup component that stands ready to take over if the active component should fail, thereby preventing a service interruption.

While such redundancies are beneficial, it would be inordinately expensive or inefficient to simply provide backups for every hardware component. Rather, it is desired to provide redundancy only where it is most beneficial to do so.

Even greater efficiencies may be achievable where it is possible to configure existing components to provide such redundancy without requiring duplication of the entire component. For example, if network switches were equipped with adequate internal redundancies, it would be more efficient to use such switches to achieve the desired level of performance than it would to provide each active switch with an inactive, backup switch and the additional interconnecting cables such an arrangement would require.

SUMMARY

Accordingly, there are disclosed herein an embodiment of a physical layer interface device that includes: a first transmitter and a first receiver for a primary data path; a second transmitter and a second receiver for a secondary data path; a third transmitter and a third receiver for a non-redundant data path; and a multiplexer. The third receiver is coupled to provide a data stream received from the non-redundant data path concurrently to the first and second transmitters, and the multiplexer provides the third transmitter with a selected one of the data stream received via the primary data path and the data stream received via the secondary data path.

A first disclosed network switch embodiment includes multiple physical layer interfaces, an internal switch fabric, and at least one controller. The multiple physical layer interfaces each convey data stream packets from a respective network port to respective primary and secondary data paths, and convey data stream packets from a selected one of the respective primary and secondary data path to the respective network port. The internal switch fabric directs data stream packets between the multiple physical layer interfaces. The controller configures at least one of the multiple physical layer interfaces to transition from its respective primary data path to its respective secondary data path when the controller detects a fault associated with the respective primary data path.

A second disclosed network switch embodiment also includes multiple physical layer interfaces, an internal switch fabric, and at least one controller. In this embodiment, the multiple physical layer interfaces each convey data stream packets from a respective non-redundant data path to respective primary and secondary network ports, and convey data stream packets from a selected one of the respective primary and secondary network ports to the respective non-redundant data path. The internal switch fabric directs data stream packets between the multiple physical layer interfaces. The controller configures at least one of the multiple physical layer interfaces to transition from its respective primary network port to its respective secondary network port when the controller detects a fault associated with the respective primary network port.

Each of the foregoing embodiments may be implemented individually or conjointly, and may be implemented with any one or more of the following features in any suitable combination: 1. a controller that determines a link status for the primary data path and controls the multiplexer to select the primary or secondary data path based on the link status. 2. each of the first, second, and third transmitters send retimed data streams from a respective one of the first, second, and third receivers without error correction and regenerated error correction code protection. 3. the physical layer interface includes one or more integrated circuit modules to correct errors, perform packet integrity checking, and regenerate error correction code protection for at least the data stream provided to the first transmitter from the third receiver. 4. the second transmitter sends the data stream from at least the third receiver without error correction and regenerated error correction code protection. 5. the physical layer interface includes a second of the one or more integrated circuit modules between the multiplexer and third transmitter to generate error correction code protection for the selected one of the data streams. 6. the physical layer interface includes a third of the one or more integrated circuit modules coupled to the second receiver to perform error correction on the data stream received via the secondary data path. 7. the controller is one of multiple controllers, each of the multiple physical layer interfaces including a respective one of the multiple controllers to determine a state of the respective network port and to select between the respective primary and secondary data paths based on said state. 8. the controller detects the fault by comparing an error or packet drop rate to a predetermined threshold. 9. the switch fabric duplicates data stream packets to deliver them to each of the multiple physical layer interfaces via both the primary and secondary data paths. 10. the controller adjusts a routing plan for data packets directed to the at least one of the multiple physical layer interfaces to direct the data packets via the secondary data path rather than the primary data path.

DETAILED DESCRIPTION

Figure 1:
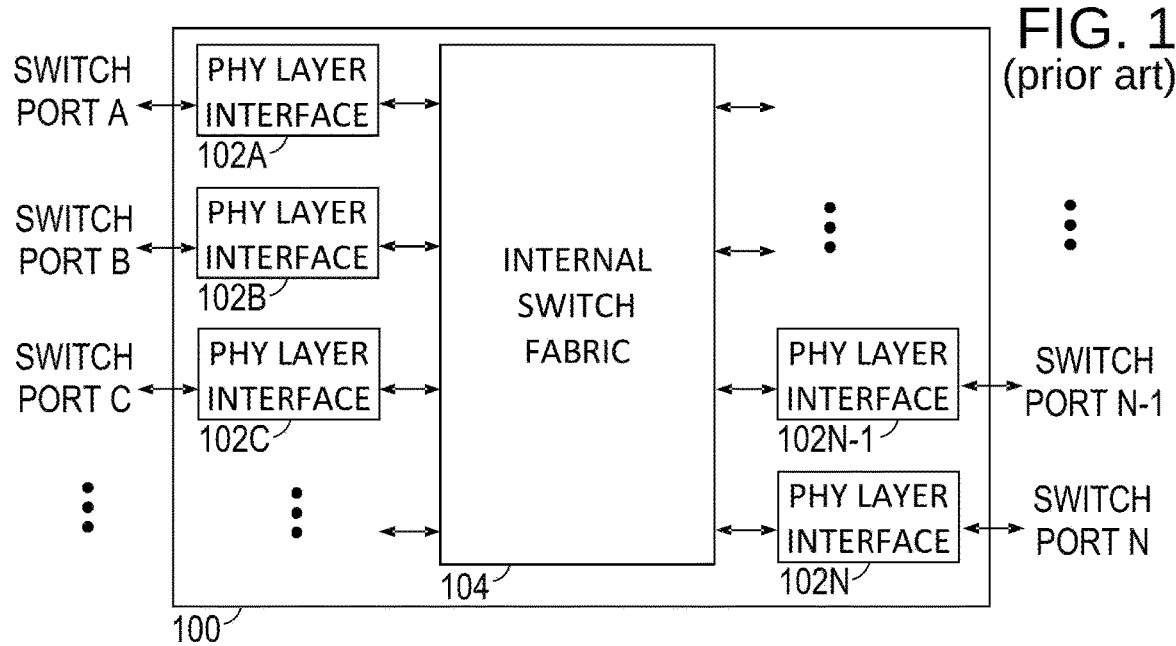
FIG. 1 is a block diagram of a conventional network switch.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a block diagram of a conventional network switch 100 having ports A-N to which network cables may be connected to convey data streams to and from other network nodes, e.g., servers or other switches. Physical layer interfaces 102A-102N couple each port to an internal switch fabric 104, providing at least channel signal transmission and reception hardware but potentially also lane synchronization, error correction coding/decoding, data scrambling/descrambling, multiplexing/demultiplexing, and data framing/extraction. The internal switch fabric 104 receives incoming data packets from the physical layer interfaces 102, examines the header information contained therein to determine at least the destination address information, and directs the data packets to the appropriate physical layer interfaces as outgoing data packets. The open literature discloses many suitable implementations for the internal switch fabric 104, ranging from cross-bar switches to bus-based architectures. See, e.g., U.S. Pat. No. 6,259,699 "System architecture for and method of processing packets and/or cells in a common switch", and U.S. Pat. No. 7,079,525 "Network switch having a hybrid switch architecture".

The internal switch fabric 104 typically includes one or more controllers that coordinate the operation of the other components to provide the desired functionality, and which may also monitor performance of the physical layer interfaces 102 and adjust their operating parameters or configurations. The controllers can be programmable general purpose processors configured by firmware, or they may take the form of application specific integrated circuits (ASICs). Typically, the bulk of the internal switch fabric 104 components are required to handle high data transfer volumes with minimal latency, which accordingly are implemented as ASICs.

When the switch is in service in a data center, it operates unceasingly, at an unrelenting pace, to direct a staggering volume of data communications. However reliable the switch components are, failures should be expected. Such failures are frequently localized, initially impairing the operation of only a small subset of ports, e.g., 1 or 2 ports. Nevertheless, those 1 or 2 ports may be a server's only connection(s) to the network.

Figure 2:
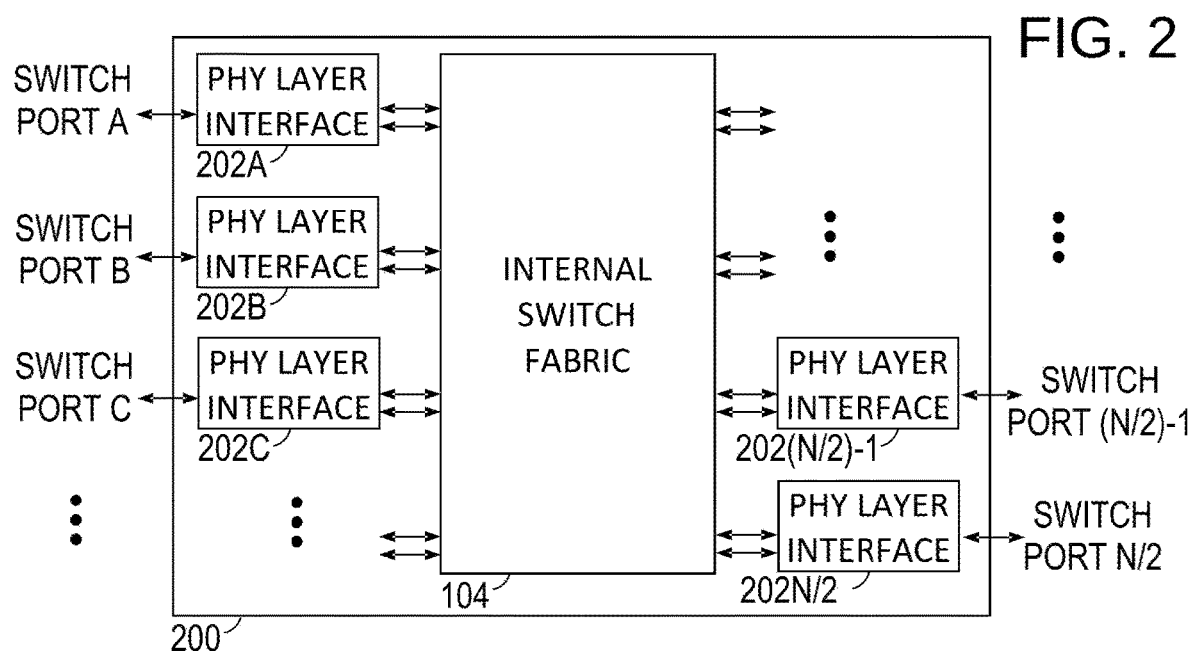
FIG. 2 is a block diagram of a network switch with added internal redundancy.

To enhance the reliability of each switch port, there is proposed herein a switch 200 employing an enhanced physical layer interface design and method. As shown in FIG. 2, the internal switch fabric 104 connects to each of the physical layer interfaces 202(A)-202(N/2) via redundant paths: a primary path and a secondary path. In an initial (default) state, only the primary path is selected for conveying data packets between the physical layer interface and the internal switch fabric. If performance over a given primary path becomes degraded, the associated physical layer interface 202 can switch (or be switched) to a backup state in which only the secondary path is selected for conveying data packets between the physical layer interface and the internal switch fabric. In either case, data communications via the external switch port can continue through the non-redundant side of the physical layer interface. The use of the backup state may provide time for the performance degradation issues to be diagnosed and corrected.

The primary and secondary paths may be coupled to relatively independent portions of the internal switch fabric 104, such that both paths are unlikely to be affected by an individual or localized component failure. In some contemplated embodiments, the internal switch fabric 104 merely re-routes data flow from a failed primary data path to the associated secondary data path when a failure is detected. The failure may be detected as a rate of bit errors, symbol errors, or dropped packets exceeding a predetermined threshold. In other contemplated embodiments, the internal switch fabric 104 duplicates data packets addressed for each given port to provide them on both the primary and secondary data paths so that the transition from primary to secondary data paths can be accomplished merely with a reconfiguration of the corresponding physical layer interface.

Note that if the internal switch fabric 104 supports only the same number of paths as in FIG. 1, the number of switch ports in the FIG. 2 embodiment will be halved in return for the increased reliability. Conversely, the number of switch ports can be maintained in the FIG. 2 embodiment if the internal switch fabric is scaled to support twice as many paths as in FIG. 1.

Figure 3:
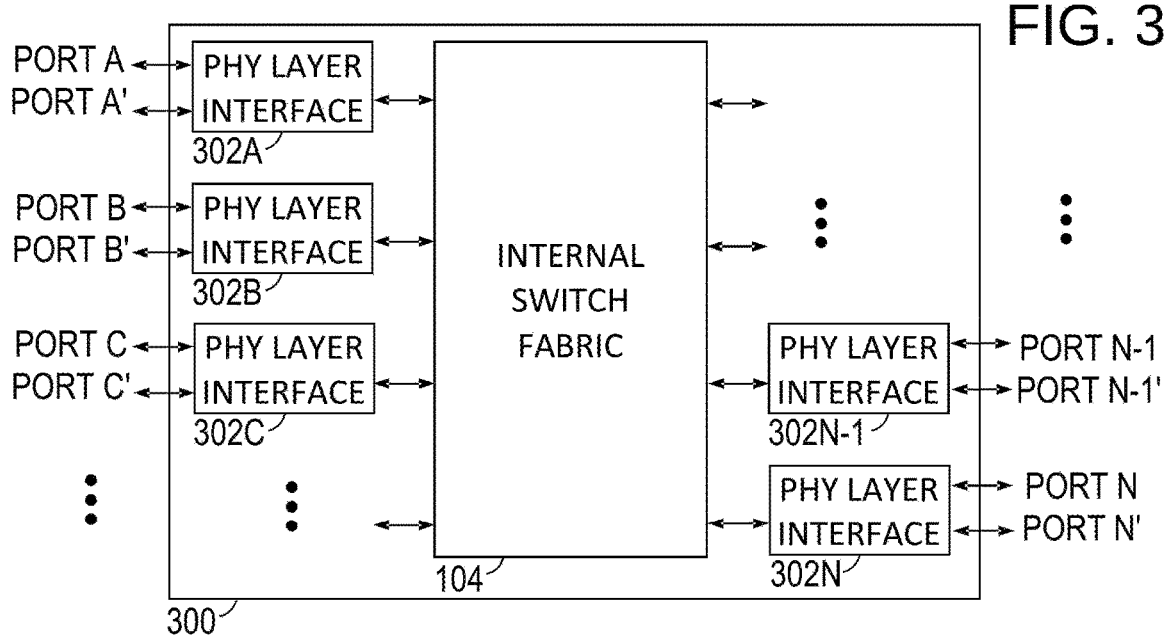
FIG. 3 is a block diagram of a network switch with added connection redundancy.

In a related situation where the internal switch components prove to have a lower failure rate (higher mean time to failure) than the port connectors and associated network cables, the redundant and non-redundant sides of the physical layer interface may be reversed as shown in FIG. 3. The illustrative network switch 300 shows each of the physical layer interfaces 302A-302N coupled to redundant external ports: primary ports A-N and secondary ports A'-N'. (It is expected that the redundant ports would be connected to the same external node by redundant cables.) The internal switch fabric 104 is coupled to each of the physical layer interfaces by a single non-redundant path. As before, in an initial (default) state, only the primary ports are selected for conveying data streams to and from the external node (e.g., a server or another switch). If performance over a given primary port becomes degraded, the physical layer interface 202 can switch, or be switched, to a backup state in which the associated secondary port is selected for conveying data streams to and from the associated external node. In both states, data packets would continue to be conveyed by the non-redundant path to and from the internal switch fabric 104.

Figure 4:
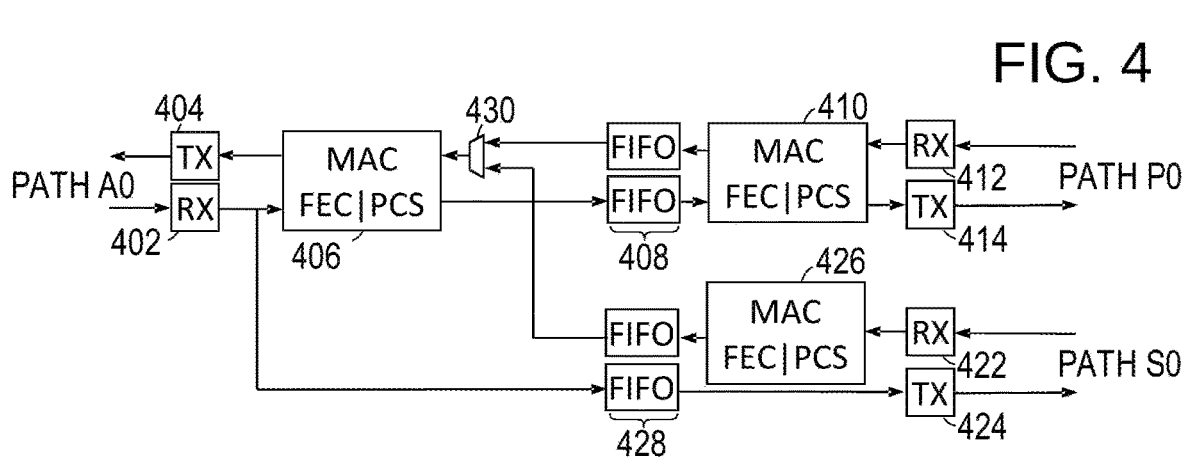
FIG. 4 is a block diagram of a first illustrative physical layer interface.

FIG. 4 shows an illustrative implementation of a physical layer interface coupling a non-redundant path ("Path A0") to two redundant paths ("Path P0" and "Path S0"). The discussion here avoids delving into unnecessary detail, but additional implementation detail for the physical layer interface components can be found in, e.g., co-owned U.S. Pat. No. 10,212,260 "SerDes Architecture with a Hidden Backchannel Protocol" ("Sun"), which is hereby incorporated herein by reference in its entirety. Each data path discussed herein may be a multi-lane data path operated in compliance with the Ethernet Standard (IEEE Std 802.3-2015 or later), in which case any switch to the data path is applied concurrently across all lanes.

A receiver 402 and transmitter 404 connect to a non-redundant data path, shown here as Path A0 of an external data port, to receive and send an data stream. In accordance with the Ethernet Standard, and as more fully described in the Sun patent, the receiver 402 and transmitter 404 may implement the following sublayers of the Ethernet protocol: Physical Media Attachment (PMA), and Physical Medium Dependent (PMD). For the receiver, this would include equalization, symbol detection, serial to parallel conversion, and lane de-skewing. For the transmitter, this would include parallel-to-serial conversion, symbol modulation, pre-equalization, and transmission.

A MAC module 406 implements the Forward Error Correction (FEC), Physical Coding Sublayer (PCS), and Media Access Control (MAC) sublayers of the Ethernet protocol, providing among other things symbol detection/decoding, correction of errors (for incoming data) and regeneration of the error correction code protection (for outgoing data), as well as packet integrity verification (for incoming data) and checksum generation (for outgoing data).

First-in First-out (FIFO) buffers 408 couple the MAC module 406 to a second MAC module 410 for the primary data path P0. A second receiver 412 and transmitter 414 couple the second data link module 410 to the primary data path P0, implementing the PMA, PMD functions.

For the secondary data path S0, a third receiver 422 provides a parallel detected symbol data stream to a third data link module 426, which a second set of FIFO buffers 428 couples to the first data link module 406 via a multiplexer 430. The multiplexer 430 selects FIFO buffers 408 when the primary data path is active, and selects FIFO buffers 428 when the secondary data path is active. In either state, the FIFO buffers 428 may couple the parallel detected symbol data stream from receiver 402 to the third transmitter 424 for transmission on the secondary data path S0.

In the default state where all data paths are available, the multiplexer 430 selects the primary data path. The non-redundant data path is provided with the data stream received via the primary data path P0, and the data stream received via the secondary data path S0, if any, is discarded. The multiplexer state may be controlled by an internal register of the physical layer interface device, which can be set by the physical layer device if an error is detected internally or can be set by an external controller (e.g., the switch fabric controller). The physical layer interface device may determine a link status or network port state based on, e.g., bit error rate, symbol error rate, packet loss rate, etc., determining a valid status or state when the error rate is below a predetermined threshold. For example, MAC module 410 can detect symbol errors and packet errors to monitor an error rate and thereby determine whether a fault is associated with the primary data path (or alternatively with the currently selected data path).

The data stream received via the non-redundant data path A0 is broadcast through both the primary and secondary ports P0, S0. The data stream going to the primary port P0 passes through the data link modules 406, 410, which provide FEC termination and re-generation, as well as packet integrity checks. The data stream going to the secondary port follows a "retiming" path, which lacks the FEC/PCS/MAC functionality. This path relies on the external node and the internal switch fabric for error correction and packet integrity checks for the link between them; in this state the physical layer interface does not provide such protection for the individual link segments.

We note here that when the primary data path is active (selected), it is possible for the secondary data path to experience multiple outages without affecting the traffic between the non-redundant path and the primary data path. If, due to a hardware or software failure, the primary path P0 goes down, the data stream received via the non-redundant data path A0 is still broadcast to the secondary data path S0 and any data received via the secondary data path is conveyed to the multiplexer 430, which can select that data for transmission via the non-redundant data path. The physical layer interface or an external controller can detect the failure and change the state of the multiplexer 430. The transition between states is fast, i.e., on the order of a few nanoseconds. The link status across the non-redundant and secondary data paths remains stable during the transition.

Although the link status can generally tolerate a truncated packet or two such as might be caused by an unsynchronized transition of the multiplexer 430, the physical layer interface can readily arrange for a synchronized transition. The physical layer interface may monitor the packet header information, enabling a transition to begin after the end of a packet from the primary path, and to complete when a packet from the secondary path begins. A idle pattern may be used to maintain the link during the transition interval.

The transition may be associated with an error code or alert signal in the physical layer interface's internal registers, causing the switch controller to convey an alert message to service personnel. Because the secondary data path is operable, the server remains connected and available while service personnel have time to diagnose and address the cause of the primary data path failure.

When the primary data path returns to operation, the MAC modules 406, 410 can resume or continue conveying the data stream received via the non-redundant data path A0 to the primary data path P0. The data stream (if any) received via the primary data path P0 is conveyed to the multiplexer 430, but because the secondary path is selected, that data stream is dropped. At this point, however, the physical layer interface stands ready to transition back to the primary data path upon instruction from the controller. As before, the state transition is fast, on the order of a few nanoseconds.

Figure 7:
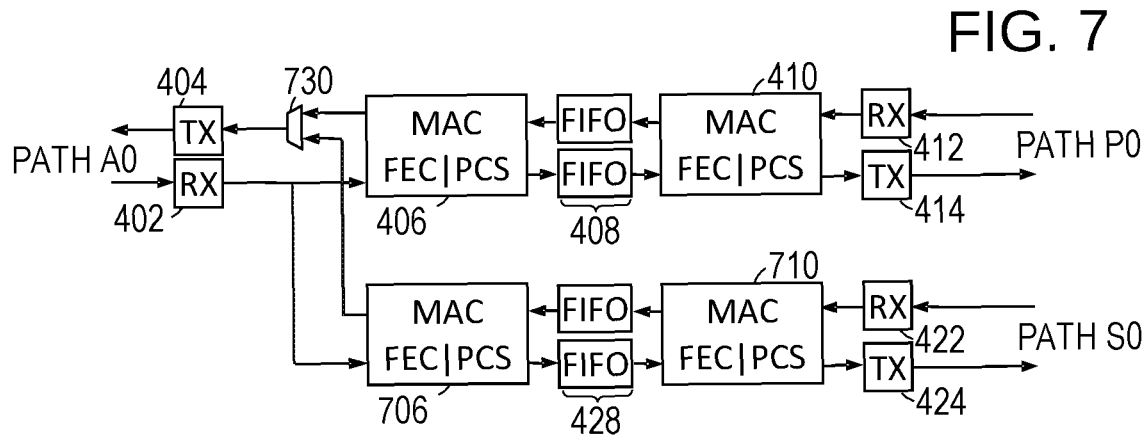
FIG. 7 is a block diagram of a second illustrative physical layer interface.

Though the example of FIG. 4 provides an asymmetric FEC/PCS/MAC functionality for data traveling to and from the secondary path S0, alternative embodiments are contemplated which provide symmetric treatment. FIG. 7 shows an alternative embodiment which includes the previously discussed MAC modules 406, 410 to provide FEC/PCS/MAC functionality between the primary and non-redundant data paths, but further includes MAC modules 706, 710 to provide the same functionality between the secondary and non-redundant data paths. With this arrangement of MAC modules, each of the data paths can operate with some degree of independence. Note that the multiplexer 430 (FIG. 4) has been omitted, and instead a multiplexer 730 is provided at the input of the transmitter 404 to select between the data stream from MAC module 406 and the data stream from MAC module 706.

Figure 8:
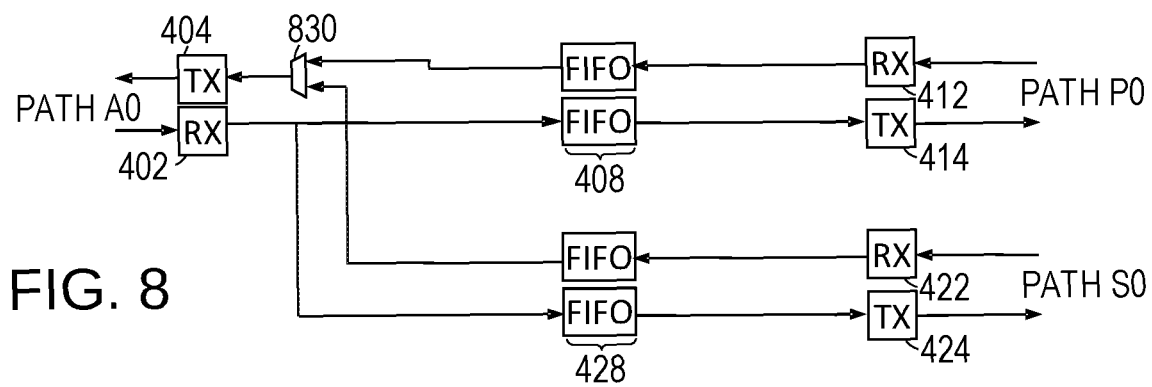
FIG. 8 is a block diagram of a third illustrative physical layer interface.

FIG. 8 shows another alternative embodiment which omits the FEC/PCS/MAC functionality altogether, using receivers to perform equalization and symbol detection, and transmitters to retransmit the detected symbols, thereby providing a retiming functionality without error correction or packet integrity verification. A multiplexer 830 is provided at the input of transmitter 404 to choose between the data streams received via the primary and secondary paths. Such retiming implementations may employ unsynchronized switching between the primary and secondary data paths, potentially causing packet truncation and associated transients in the link status.

Though the foregoing digital embodiments are preferred, it is also feasible to implement the physical layer interface as an analog signal repeater, providing filtering and signal amplification without symbol detection and remodulation, along with a multiplexer to choose between primary and secondary data paths. Physical layer interfaces that support multiple interface operations (analog repeater, digital retimer, MAC functionality, and asymmetric combinations thereof) may offer additional degrees of flexibility to enable graceful degradation in the presence of hardware faults.

Figure 5:
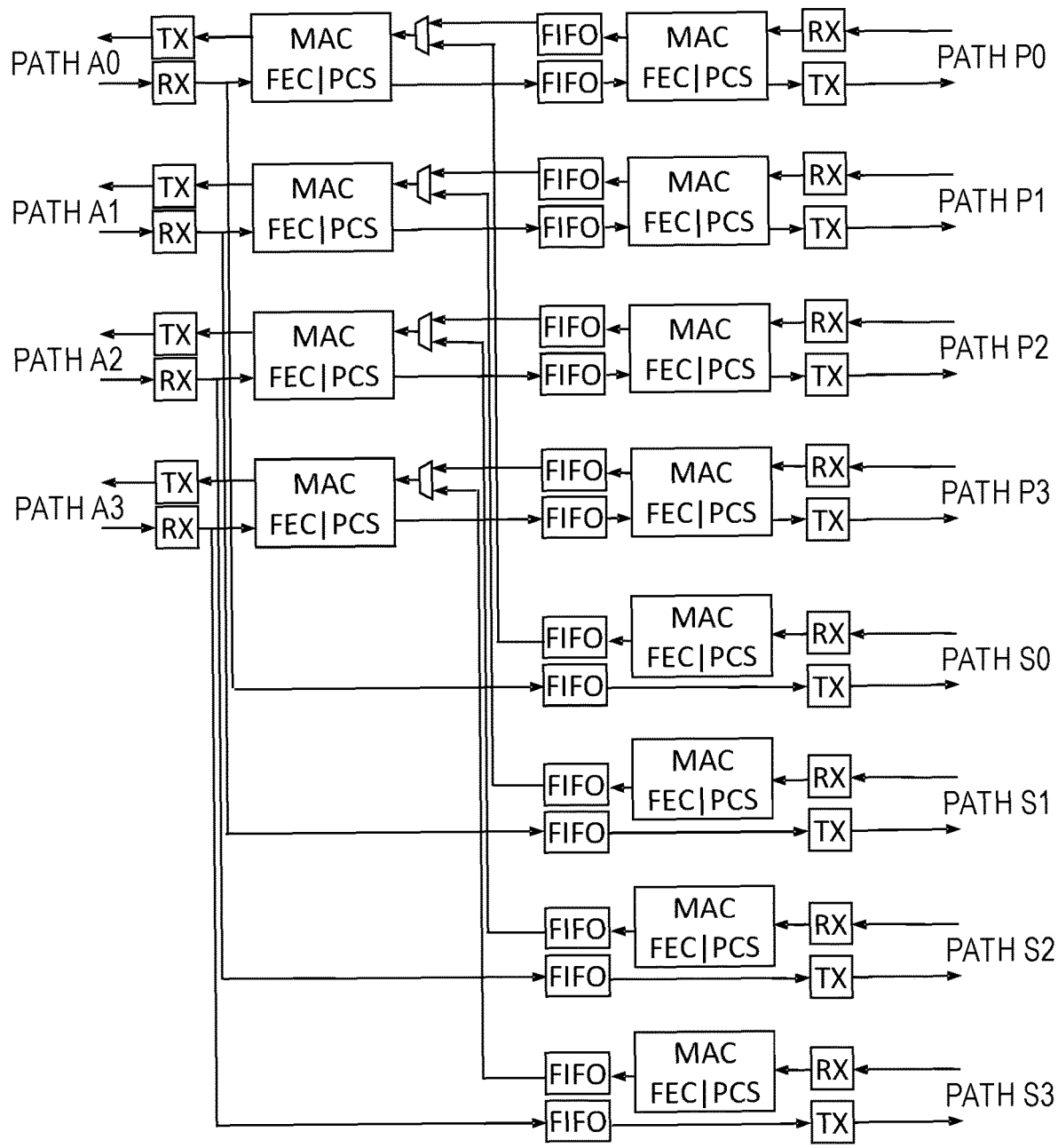
FIG. 5 is a block diagram of an illustrative multichannel physical layer interface.

To support multiple ports or non-redundant data paths, multiple instances of the physical layer interface may be included in a single packaged integrated circuit as a physical layer interface device. FIG. 5 shows an example in which four instances of the physical layer interface are included in a single device. Each instance is expected to operate independently of the others, so that, e.g., three of the instances may continue operating in the default state while a fourth begins operating with the secondary data path selected.

Figure 6:
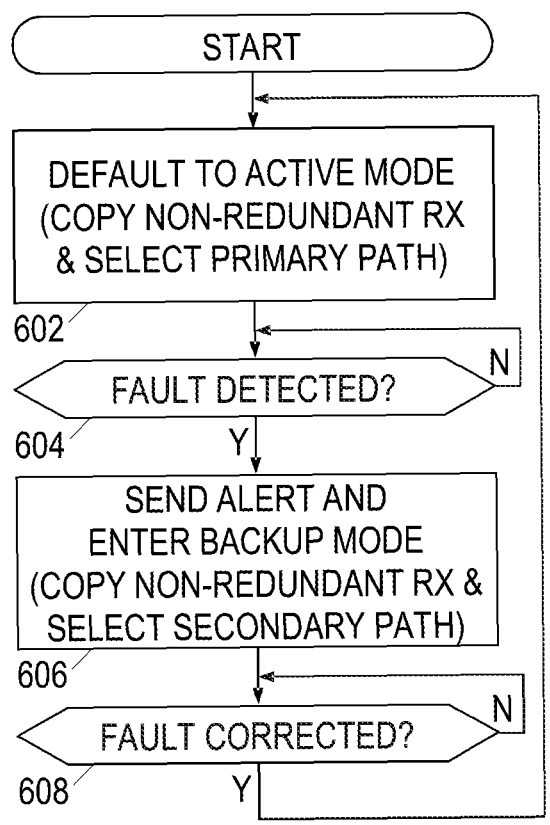
FIG. 6 is a flow diagram of an illustrative reliability enhancement method.

FIG. 6 is a flow diagram of an illustrative reliability enhancement method which may be implemented by the controller in a switch having the disclosed physical layer interfaces. (The controller may be part of the internal switch fabric or included in one or more of the physical layer interfaces.) In block 602, the physical layer interface defaults to an active state in which data received via the non-redundant path is copied to both the primary and secondary data paths, and the data transmitted via the non-redundant data path is received via the primary data path.

In block 604, the active state is preserved until a fault is detected on the primary data path. In block 606, the physical layer interface transitions to a backup state, in which data received via the non-redundant path is copied to both the primary and secondary data paths, and the data transmitted via the non-redundant data path is received via the secondary data path. An alert is preferably communicated to initiate correction of the fault.

In block 606, the backup state is preserved until the fault is corrected, at which time the method returns to block 602. The state transitions are expected to be fast, preserving the stability of each data path.

The foregoing embodiments are expected to facilitate practical and economic realization of path redundancies. Numerous alternative forms, equivalents, and modifications will become apparent to those skilled in the art once the above disclosure is fully appreciated. For example, the embodiments described above provide redundancy in the form of a single secondary data path for each primary data path, but those of ordinary skill would recognize that the disclosed principles can be readily extended to provide multiple secondary data paths to further increase the redundancy for each primary data path. It is intended that the claims be interpreted to embrace all such alternative forms, equivalents, and modifications that are encompassed in the scope of the appended claims.

What is claimed is:

1. A physical layer interface device that comprises:
    a first transmitter and a first receiver for a primary data path;
    a second transmitter and a second receiver for a secondary data path;
    a third transmitter and a third receiver for a non-redundant data path, the third receiver coupled to provide a data stream received from the non-redundant data path concurrently to the first and second transmitters;
    a multiplexer that provides the third transmitter with a selected one of the data stream received via the primary data path and the data stream received via the secondary data path; and
    one or more integrated circuit modules to correct errors and regenerate error correction code protection for the data stream provided to the first transmitter from the third receiver,
    wherein the second transmitter sends the data stream from the third receiver without error correction and without regenerated error correction code protection.

2. The physical layer interface device of claim 1, further comprising a second of the one or more integrated circuit modules between the multiplexer and third transmitter to generate error correction code protection for the selected one of the data streams.

3. The physical layer interface device of claim 2, further comprising a third of the one or more integrated circuit modules coupled to the second receiver to perform error correction on the data stream received via the secondary data path.

4. A network switch that comprises:
    multiple physical layer interfaces that each convey data stream packets from a respective network port to respective primary and secondary data paths, and convey data stream packets from a selected one of the respective primary and secondary data paths to the respective network port;
    an internal switch fabric that directs data stream packets between the multiple physical layer interfaces; and
    a controller that configures at least one of the multiple physical layer interfaces to transition from its respective primary data path to its respective secondary data path when the controller detects a fault associated with the respective primary data path,
    wherein each of the multiple physical layer interfaces includes:
    a first transmitter and a first receiver for its respective primary data path;
    a second transmitter and a second receiver for its respective secondary data path;
    a third transmitter and a third receiver for its respective network port, the third receiver coupled to provide a data stream received from the network port concurrently to the first and second transmitters;
    a multiplexer that provides the third transmitter with a selected one of the data stream received via the primary data path and the data stream received via the secondary data path; and
    one or more integrated circuit modules to correct errors, check packet integrity, and regenerate error correction code protection for at least the data stream provided to the first transmitter from the third receiver.

5. The network switch of claim 4, wherein the controller detects the fault by comparing a packet drop rate to a predetermined threshold.

6. The network switch of claim 4, wherein the controller configures the internal switch fabric to duplicate data stream packets to deliver the data stream packets to each of the multiple physical layer interfaces via both the primary and secondary data paths.

7. The network switch of claim 4, wherein the controller causes the internal switch fabric to adjust a routing plan for data packets directed to the at least one of the multiple physical layer interfaces, the adjusted routing plan directing the data packets via the secondary data path rather than the primary data path.

8. The network switch of claim 4, wherein the controller is one of multiple controllers, each of the multiple physical layer interfaces including a respective one of the multiple controllers to determine a state of the respective network port and to select between the respective primary and secondary data paths based on said state.

9. The network switch of claim 4, wherein in each of the multiple physical layer interfaces the second transmitter sends the data stream from the third receiver without error correction and regenerated error correction code protection.

10. A network switch that comprises:
multiple physical layer interfaces that each convey data stream packets from a respective non-redundant data path to respective primary and secondary network ports, and convey data stream packets from a selected one of the respective primary and secondary network ports to the respective non-redundant data path;
an internal switch fabric that directs data stream packets between the multiple physical layer interfaces; and
a controller that configures at least one of the multiple physical layer interfaces to transition from its respective primary network port to its respective secondary network port when the controller detects a fault associated with the respective primary network port,
wherein each of the multiple physical layer interfaces includes:
a first transmitter and a first receiver for its respective primary network port;
a second transmitter and a second receiver for its respective secondary network port;
a third transmitter and a third receiver for its respective non-redundant data path, the third receiver coupled to provide a data stream received from the non-redundant data path concurrently to the first and second transmitters; multiplexer that provides the third transmitter with a selected one of the data stream received via the primary network port and the data stream received via the secondary network port; and
one or more integrated circuit modules to correct errors, check packet integrity, and regenerate error correction code protection for at least the data stream provided to the first transmitter from the third receiver.

11. The network switch of claim 10, wherein the controller detects the fault by comparing an error rate to a predetermined threshold.

12. The network switch of claim 10, wherein the controller is one of multiple controllers, each of the multiple physical layer interfaces including a respective one of the multiple controllers to determine a state of the respective primary network port and to select between the respective primary and secondary network ports based on said state.

13. The network switch of claim 10, wherein in each of the multiple physical layer interfaces the second transmitter sends the data stream from the third receiver without error correction and without regenerated error correction code protection.

14. The network switch of claim 13, wherein each of the multiple physical layer interfaces further includes a second of the one or more integrated circuit modules between the multiplexer and third transmitter to generate error correction code protection for the selected one of the data streams.

15. The network switch of claim 14, wherein each of the multiple physical layer interfaces further includes a third of the one or more integrated circuit modules coupled to the second receiver to perform error correction on the data stream received via the secondary data path.

16. The network switch of claim 9, wherein each of the multiple physical layer interfaces further includes a second of the one or more integrated circuit modules between the multiplexer and third transmitter to generate error correction code protection for the selected one of the data streams.

17. The network switch of claim 16, wherein each of the multiple physical layer interfaces further includes a third of the one or more integrated circuit modules coupled to the second receiver to perform error correction on the data stream received via the secondary data path.

* * * * *